US 6,678,275 B1

(12) United States Patent
DeGrandpre et al.

(10) Patent No.: US 6,678,275 B1
(45) Date of Patent: Jan. 13, 2004

(54) MULTITRUNK ATM TERMINATION DEVICE

(75) Inventors: Marcel DeGrandpre, Kanata (CA); Alexandre Pires, Kanata (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 09/506,909

(22) Filed: Feb. 18, 2000

Related U.S. Application Data

(60) Provisional application No. 60/124,692, filed on Mar. 16, 1999.

(30) Foreign Application Priority Data

Feb. 25, 1999 (GB) ................................. 9904247

(51) Int. Cl.[7] .............................. H04L 12/56; H04J 3/04
(52) U.S. Cl. ..................... 370/395.7; 370/412; 370/536
(58) Field of Search ............................. 370/238.1, 389, 370/396, 394, 428, 429, 395.4, 395.7, 395.72, 412, 536

(56) References Cited

U.S. PATENT DOCUMENTS

| 5,875,192 | A | * | 2/1999 | Cam et al. | ............... | 370/395.7 |
| 5,970,067 | A | * | 10/1999 | Sathe et al. | ................. | 370/394 |
| 6,266,324 | B1 | * | 7/2001 | Kirino et al. | ............... | 370/230 |
| 6,269,096 | B1 | * | 7/2001 | Hann et al. | ................. | 370/366 |
| 6,490,294 | B1 | * | 12/2002 | Manzado et al. | ........... | 370/465 |
| 6,490,296 | B2 | * | 12/2002 | Shenoi et al. | ................ | 370/469 |

FOREIGN PATENT DOCUMENTS

| WO | 96/08120 | 3/1996 |
| WO | 96/17489 | 6/1996 |
| WO | 98/08355 | 2/1998 |

\* cited by examiner

Primary Examiner—Melvin Marcelo
Assistant Examiner—Nhat Do
(74) Attorney, Agent, or Firm—Marks & Clerk

(57) ABSTRACT

A termination device for connection to a group of TDM (time division multiplexed) trunks is capable of sending cells over one or more links either individually or as part of an inverse multiplexed group. The device includes a Utopia interface for receiving an incoming cell stream, a buffer for storing incoming cells at specific memory locations identified by pointers obtained from a queue of available pointers, a round robin scheduler for sequentially assigning cells to links forming an IMA group or individually in the UNI mode, and a pointer queue for each channel address, the pointer queue indicating the location of the next cell to be transmitted for each virtual channel. An adaptive shaper determines when a stuff cell is inserted and a per link output circuit places cells on the links, which can operate in CTC or ITC mode. The device can operate in mixed mode where up to four IMA and/or up to eight UNI channels can be supported concurrently. The links assigned to the IMA or UNI channels is programmable.

16 Claims, 2 Drawing Sheets

MULTITRUNK ATM TERMINATION DEVICE

CROSS REFERENCE TO RELATED APPLICATIONS

This application claims the benefit under USC 35 119 (e) of U.S. Provisional Application No. 60/124,692, filed Mar. 16, 1999.

BACKGROUND OF THE INVENTION

This invention relates to asynchronous data communications and in particular to a device designed for sending ATM or like cells over transmission links, for example T1 or E1 trunks.

Reference is made throughout this specification to cells. These cells are typically ATM cells, which are small packets of fixed size having a payload of 48 bytes and a header of five bytes.

In order to meet the increasing bandwidth demands of ATM (Asynchronous Transfer Mode) a technique is known that combines a number of slower TDM links, such as T1 and E1 links, into an aggregate channel of higher bandwidth. A technique for doing this is known as Inverse Multiplexing for ATM (IMA) and is described in the ATM Forum standard AF-PHY-0086.000.

ATM cells are subject to variable delays over the different links, and a protocol must be established to reconstruct the original cell stream at the receiving end. In accordance with the ATM Forum standard, an IMA Frame is defined and special cells, defined as IMA Control Protocol cells (ICP), are transmitted once per IMA frame.

When a transmitter is preparing to send ATM cells over an IMA channel, it must identify a group of N physical links that are to make up the channel. It then assigns a Link Identifier (LID) to each link and transmits this to the far end in ICP cells. This is a logical link identifier between 0 and 31, which is different from the physical identity of the link. The ATM cells are then transmitted over the identified links in a cyclic fashion in ascending order based on the LID assigned to each physical link. The receiver assembles the incoming cells according to the ascending order based on the link ID.

The IMA protocol defines an IMA frame that is defined as M consecutive cells on each link. The IMA frames are transmitted simultaneously on each link. An ICP cell is sent on each link once per IMA frame. An offset number identifies the position of the ICP cell, which can be different for each link. If there are no ATM layer cells to be sent in an IMA frame, filler cells are transmitted to maintain a continuous stream of cells at the physical layer.

While the need for aggregate bandwidth is sometimes present, that is not always the case, and sometimes it is desirable to set up a standard UNI (User Network Interface) mode on each link.

SUMMARY OF THE INVENTION

An object of the invention is an efficient and cost-effective device capable of providing both an IMA and a UNI (User Network Interface) protocol interface.

According to the present invention a termination device is a termination device for connection to a group of TDM (time division multiplexed) links comprising an interface circuit for receiving an incoming cell stream forming one or more virtual channels; a buffer memory for storing incoming cells at memory locations identified by pointers; a pointer queue for each virtual channel, said pointer queue indicating the memory locations of queued cells in each channel; a control unit for interrogating the pointer queue and assigning the next incoming cell to the next free memory location for the associated channel; a scheduler selectively operable to sequentially assign cells from each queue in said buffer memory either to individual links or to a group of links forming an inverse multiplexed group; and a per link output circuit for placing cells from said memory locations on said links to form outgoing virtual channels.

The interface circuit is preferably provides a Utopia level 2 interface for connection to an ATM adaptation layer device. The links are physical links in the PDH (Plesiochronous Digital Hierarchy) network transporting the data, for example T1 or E1 trunks. Depending upon whether the device is in UNI mode or IMA mode, a channel will consist of a single link or a group of physical links having an aggregate bandwidth equal to the sum of the bandwidth of the individual links. In IMA mode, the round robin scheduler distributes successive ATM cells as determined by their address pointers to successive physical links in ascending order based on their link ID numbers. In UNI mode, the successive ATM cells are passed directly to the outgoing link associated with their channel.

The input circuit preferably includes filtering functions. An address is assigned to each channel, which can either be an IMA channel consisting of a group of physical links or a UNI channel consisting of a single link. There can be eight UNI links and up to 4 IMA groups, so that 12 Utopia addresses are provided.

The invention also provides a termination device for connection to a group of TDM (time division multiplexed) links and capable of receiving streams of cells forming a virtual channel over one or more of said trunks, said cell streams arriving on said individual links or on a plurality of said links forming an inverse multiplexed (IMA) group, comprising a per link input circuit for receiving incoming cell streams on said links; a per link cell delineation circuit for delineating incoming cells; a per link means for segregating control cells from user cells; a per group rate recovery block to generate the IDCR (IMA Data Cell Rate); a buffer memory for storing incoming cells of an IMA group at specific memory locations; a per group inverse scheduler controlled by the IDCR and for arranging incoming cells of an IMA group in the correct order; an output circuit for outputting cells to a receiving device through an interface; and a memory controller selectively operable to direct incoming cells to said memory in an inverse multiplexing mode or to said output circuit in a UNI mode.

BRIEF DESCRIPTION OF THE DRAWINGS

The invention will now be described in more detail, by way of example only, with reference to the accompanying drawings, in which.

DETAILED DESCRIPTION OF THE INVENTION

The transmit and receive blocks are independent and work independently to provide support for IMA options such as the asymmetric operations and independent clocking modes.

Figure 1:
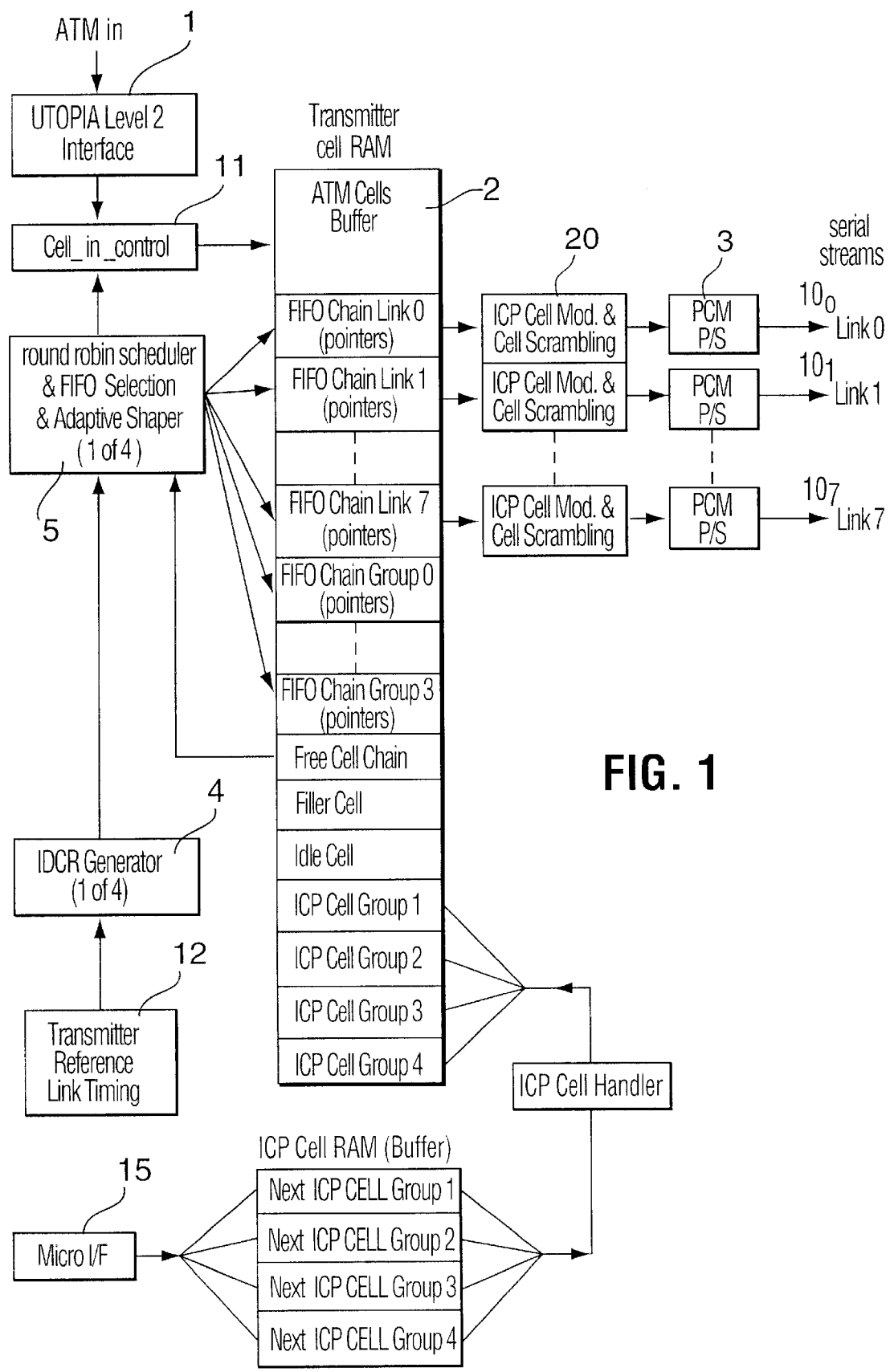
FIG. 1 is a block diagram of a termination device for sending ATM cells over one or more trunks.

The transmit device shown in FIG. 1 has Utopia level 2 interface 1 and eight outgoing PCM T1 trunks $10_0$–$10_7$. As is well known in the art, T1 trunks provide digital physical links operating at 1.54M bits/sec. In ATM model the ATM adaptation layer (AAL) takes incoming data segments into to fixed size packets, called cells, of 53 bytes each. The transmitting device is capable of assigning ATM cell streams from the ATM adaptation layer to individual trunks or to IMA channels formed by aggregating the individual trunks.

Incoming channels in the Utopia interface are assigned addressees, which are user programmable. The interface complies with the Utopia specification level 2 for an 8-bit interface. The Utopia interface does not require a buffer since the incoming cells are stored in buffer memory block 2 in a manner to be described. The buffer block 2 providing the internal transmit memory comprises 4096 bytes of memory divided into 64 blocks of 64 bytes each. Each block can store one ATM cell, which is actually only 52 bytes long, since the header contains one byte forming the Error Check Sequnce (ECS) which is not stored with the rest of the cell, but rather is generated when the cell is transmitted. The remaining 12 bytes in each block are used for memory location pointers.

Cell control unit 11 feeds the incoming ATM cells to the buffer block 2 at the next free memory location, which is identified by a pointer. Each Utopia address, i.e. each channel, whether it be a single UNI channel or an aggregate IMA channel, has a pointer queue associated with it. In addition, there is a queue for unused or free pointers.

For each Utopia address, the control unit 11 interrogates the pointer queue, identifies the next free pointer for that address, and then places the next incoming ATM cell into the memory location identified by that pointer. The number of ATM cells that can be assigned to any Utopia queue is programmable between 0 and 15.

The pointer queue indicates the location in the memory where the next ATM cell received at the Utopia interface is located. If the device is operating in the UNI mode, then the pointer indicates the location of the next cell to be sent on the physical link $10_0 \ldots 10_7$. In IMA mode, the round robin scheduler 5 moves the pointer from the Utopia pointer queue to the appropriate PCM link pointer queue so as to feed the next cell to the appropriate outgoing physical link in accordance with the IMA scheduler. This will be the next sequential logical link in ascending order.

In addition to determining which cell is to be transmitted on which physical link, the round robin scheduler 5 also determines when it is time to send an ICP cell or a user cell. It will be recalled that the ICP cells are transmitted once per IMA frame with a given offset that may vary from link to link. If no user cells are ready to be transmitted, a filler cell is sent instead. When a cell has been transmitted, its associated pointer is returned to the free pointer queue.

The level of the transmit queue for each link that is part of an IMA group is monitored and compared to the level of one link, designated a reference link, of the same IMA group. When a specific difference value is reached, a stuff cell is inserted in the queue of the link to compensate for the difference in the clock speed of each link. When a stuff cell is transmitted, the round-robin scheduler handles the ICP cells by controlling the link stuff cell indication bits and inserting the additional ICP cell as required. This is determined by an adaptive shaper block 4, which determines when a stuff cell is to be inserted. Two different algorithms can be selected: one to support the Common Transmit Clock mode which defines a fixed rate of stuffing events; and an adaptive algorithm to support the Independent Transmit Clock mode where each link can operate with their own independent clock frequencies.

IDCR (IMA Data Cell Rate) generator 4 counts the total number of ATM cells (ICP and stuff cells excluded), that are transmitted over a reference link during a specified time interval. This time interval is based on the system clock and is fully programmable. The interval determines the accuracy of the IDCR.

The IDCR generator 4 controls the round-robin scheduler 5 and instructs it when to accept new ATM user cells from the Utopia interface 1, as required to minimize cell delay variation (CDV).

When there is room available in the transmit buffer 2, which is in the form of a FIFO, a new user cell can be accepted from the Utopia interface 1. The size of the FIFO in the transmit buffer 2 effects the CDV (cell delay variation). The cells from the buffer 2 are output through ICP cell modifier unit 20 to the per link transmit PCM block 3, which includes a parallel to serial converter for placing the cells on the outgoing links as a serial bit stream.

The ICP cell modifier unit 20, modifies the content of some bytes of the ICP cells that are unique for each link as required by the IMA protocol. The use of the ICP cell modifier enables the definition of a common ICP cell for an IMA group that is modified as required and minimizes the on-chip storage space and provides flexibility to adapt to future changes.

The content of the ICP cells, the filler cell, and the idle cell is fully programmable through a microprocessor (not shown) connected to microprocessor interface 15.

In UNI mode, the IDCR generator and the ICP cell modifier are by-passed since no IDCR calculation is required, and no ICP or stuff cells are inserted. When a particular PCM link $10_0$ to $10_7$ is ready to accept another cell, if no cell is waiting in the transmit buffer 2, an idle cell is sent. The transmit buffer 2 can accept up to 15 ATM cells per link. It is fully programmable.

The transmit blocks 3 provide flexibility in PCM format and allow various clocking and framing modes. Each PCM link operates independently to support the ITC clocking mode, asymmetric operation and concurrent operation of up to four IMA groups and up to eight links in UNI mode.

A mechanism to detect the presence of a clock has been added. The user can find out if a clock is present on any of the eight receive clocks, eight transmit clocks, or four PLL REF clock signals. There are various options in the transmit unit that are programmable, such as the scrambling mode in block 20, the use of the ATM cosec value to add to the HEC header calculation, and the use of various counters and filters.

Figure 2:
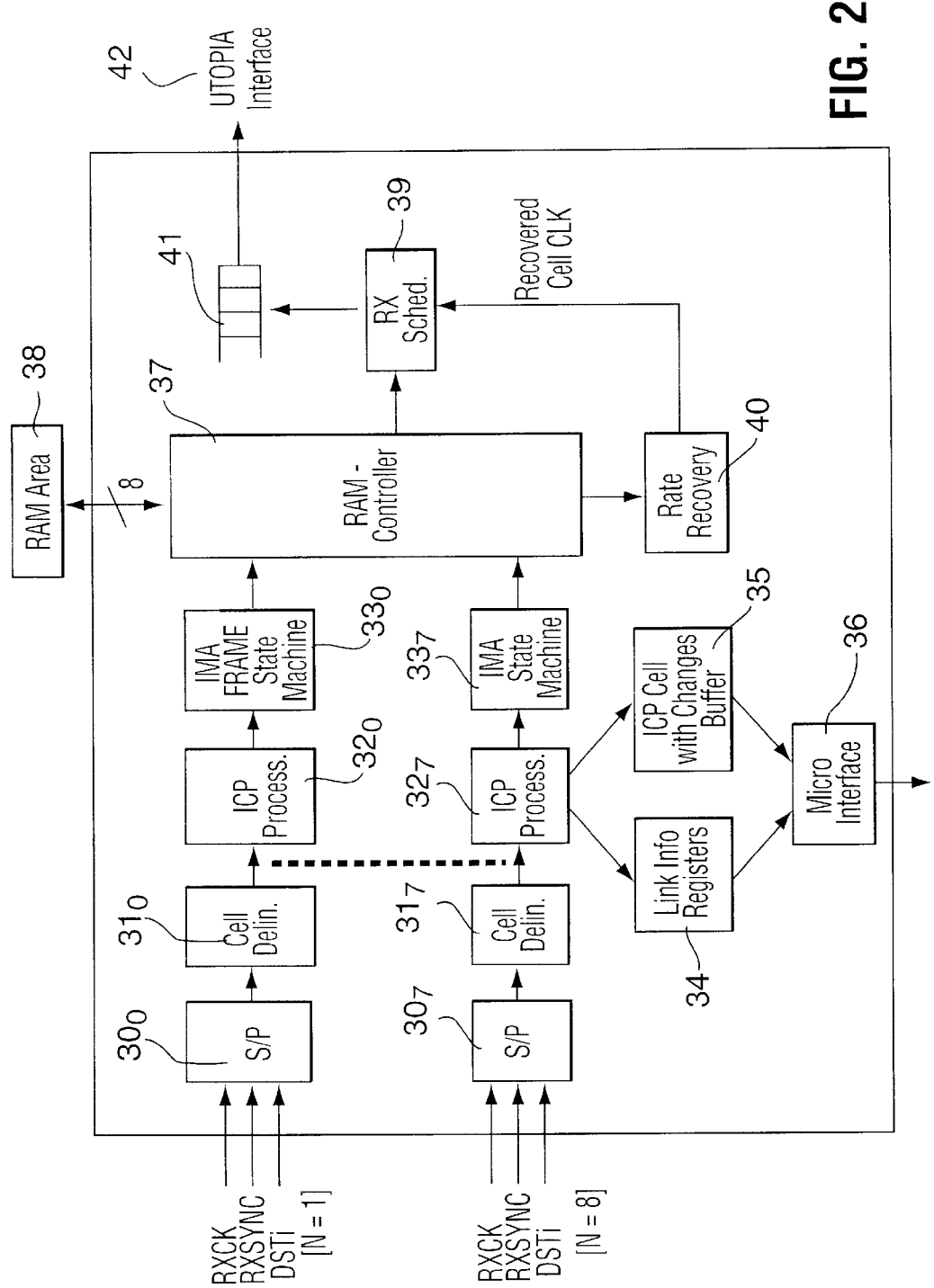
FIG. 2 is a block diagram of a termination device for receiving ATM cells from one or more trunks.

The receive unit, shown in FIG. 2, comprises a per link PCM receive block $30_0$ to $30_7$, a per link cell delineation unit $31_0$ to $31_7$, and ICP cell processing unit $32_0$ to $32_7$, and IMA state machine $33_0$ to $33_7$. The ICP processing unit segregates the ICP cells and passes the link information to link information registers 34 and selected ATM cells to the ICP Cell buffer with changes 35. The outputs of the link information register 34 and the cell buffer 35 are passed on to microprocessor interface 36 for forwarding to the external microprocessor (not shown) for validation and processing.

The cell delineation units $31_0$ to $31_7$ look at the incoming data on a byte-by-byte basis and try to achieve ATM cell delineation.

The ICP processing unit $32_0$ to $32_7$ verifies the validity of an incoming ICP cell and reports a problem when a violation occurs. It also handles the stuff cells based on information contained in the ICP cells. Through programming registers (not shown) the user has full control over the conditions where it can accept or reject an incoming stuffing cell. The user can also select which of the first or second ICP cells is dropped when a stuff event occurs.

The IMA state machine is implemented in accordance with the IMA specifications on a per link basis.

When the receive IMA process is enabled, the valid ATM cells that are received are fed to RAM controller 37 for the ATM cells to be stored in the external RAM 38.

The IMA Data Cell Rate (IDCR) calculation is carried out in rate recovery unit 40 by counting the total number of ATM cells (ICP and stuff cells excluded) received over the reference link during a specific time interval. This time interval is based on the system clock and is programmable. The interval will determine the stability of the IDCR and a default value will be determined from simulation results. The RX IDCR is the basis for the ATM cell to be transferred to the Utopia I/F and is used as well to control the "inverse" round-robin scheduler 39.

The external static memory 38 is used to store the received ATM cells from each link and to absorb various transmit delays between links that are part of the same IMA group. The external memory configuration is limited to six combinations. This is required to control the generation of the address and is limited to reduce the load on each signal connected between the device and the external memory devices.

The use of the memory is flexible and two different mapping methods can be selected: the entire memory can be divided in 8 blocks of the same size (1 block is assigned to each link). This is referred as direct addressing mode. Alternatively, the entire memory is divided in 256 blocks and the number of blocks assigned to each link is programmable. This is referred to as pointer addressing mode. The later method utilizes chains of pointers that are assigned to each PCM link. The total number of ATM cells that can be stored is limited by the memory configuration. The delay between the links that is allowed is programmable and the user has to ensure that he is not exceeding the size of the memory. The maximum delay is programmable and can be either in increments of 1 cell when direct addressing mode is used or in increments of 16 ATM cells as a minimum when pointer addressing mode is used.

The selected implementation to re-sequence the ATM cell stream uses "aligned" read pointers and "floating" write pointers as described in Appendix B.5 of the IMA specification. The amount of delay is programmable through the use of internal pointers.

The difference between the read and write pointers provides all the required information about differential delays between links of an IMA. A register also keeps track of the maximum delay between the link with the least delay and the link with the most delay. This is updated for every IMA frame. An error condition is reported if this value exceeds the programmed maximum delay value.

The round robin scheduler is controlling the read pointers for each group or link and moves the ATM cells from external memory to the internal Utopia RX FIFO 41. The ICP cell and filler cells are dropped before they are put in the Utopia RX FIFO.

The round robin scheduler automatically handles the order by using the LID information.

The Utopia interface 42 is between the RX FIFO 41 and a Utopia bus. One address for each link (in UNI mode) and 1 address for each IMA group (in IMA mode) are supported. No underflow condition can exist and an overflow is recorded as an error condition when detected. In IMA mode, this buffer is set to 4 cells and in UNI mode, it is set to 2 cells.

In UNI mode, most of the receive functional blocks are bypassed. The cell is received by the PCM block, then it is passed to the Cell Delineation block and then goes to the RX FIFO, if the cell is good (i.e. no error). The idle and errored cells are discarded. The received cells are not stored in the external static memory and no external memory is required. There is no calculation of the IDCR or delay between links.

The current implementation supports concurrently up to four IMA groups and up to eight UNI links. Each IMA group has its own rate recovery block 40, RX scheduler block 39 to support concurrent IMA group operation, both of which minimize CDV. Each IMA group and each UNI link has its own RX Utopia FIFO 41 which provides for concurrent operation of IMA channels and UNI channels.

The use of buffer memories and pointers provides for flexibility and delivers support for IMA with minimal additional cost; both IMA and UNI modes can operate at the same time in the same device without additional cost.

The pointers are also a key element in the stuff cell timing on the transmit side and in the implementation of the round-robin scheduler. On the receive side, the pointers are used to implement the re-sequencer and calculate the various delays between the links. The pointers provide flexibility in the amount of delay each IMA group can accommodate. The method of determining the IDCR is simple and programmable. It integrates the data rate through the PCM reference link by using the system clock to count the number of cells transmitted during a time interval.

The schedulers automatically handle the insertion of user cells, filler cells, ICP cells, and stuff cells in IMA mode and the user or idle cells in UNI mode. The ICP cell modifier provides for a flexible use of a common ICP cell for each IMA group and provides the flexibility to assign any PCM link to any IMA group. The flexible cell handler on the receive side detects and processes the ICP cells and the stuff cells based on parameters selected by the user or ignores the ICP cells when configured in UNI mode.

The transmit and receive schedulers automatically handle the LID of the links.

On the transmit side, the user has the option to select the value of M (the number of cells in an IMA frame), the reference link number, the size of the FIFO, the transmit clock mode and the number of links. In the receive side, the receive blocks can operate with four different values of M and the user can specify the reference timing link or the circuit can extract the information from the incoming ICP cells. The receiver block extracts the operational values from the received ICP cell and makes it available to the user for validation through registers and through the RX ICP cell buffers. Once the IMA process is enabled, the receive block monitors the SCCI field of the ICP cell and signals the user when a new ICP cell arrives that requires processing.

The PCM modes allow direct connection to most existing T1/E1 framers. The transmit and receive blocks are independent to support simultaneous T1 and E1 operation inside the same device and to support asymmetrical operation. The transmit clock can be selected from any of the eight receive clocks or from any of four external references. The device can be configured to operate in CTC or ITC mode under software control without any support from external circuitry. A circuit is also provided to detect the presence of clock and synchronization signals to assist during diagnostics.

A significant advantage of the invention is that the device can be used in mixed mode whereby some of the links are in IMA mode and other links are in UNI mode. This offers complete flexibility to the user.

The device as described is capable of permitting links with bigger or shorter delays to be added without disruption. It can support, for example, up to 4 independent IMA groups. The number of physical links assigned to an IMA group can be programmable, for example, between 1 and 8.

There are also test modes that provide access to the internal and external memory in most of the blocks from the microprocessor interface.

We claim:

1. A termination device for connection to a group of TDM (time division multiplexed) links comprising:
    an interface circuit for receiving an incoming cell stream forming one or more virtual channels,
    a buffer memory for storing incoming cells at memory locations identified by pointers;
    a pointer queue for each virtual channel, said pointer queue indicating the memory locations of queued cells in each channel;
    a control unit for interrogating the pointer queue and assigning the next incoming cell to the next free memory location for the associated channel,
    a scheduler selectively operable to sequentially assign cells from each queue in said buffer memory either to individual links or to a group of links forming an inverse multiplexed group; and
    a per link output circuit for placing cells from said memory locations on said links to form outgoing virtual channels.

2. A termination device as claimed in claim 1, wherein said scheduler is a round robin scheduler.

3. A termination device as claimed in claim 1, wherein said scheduler also assigns filler cells and control cells to said outgoing virtual channels.

4. A termination device as claimed in claim 1, wherein said buffer memory comprises a FIFO.

5. A termination device as claimed in claim 4, further comprising an TA data cell rate (IDCR) generator for controlling said scheduler to request new user cells from said input circuit to minimize cell delay variation.

6. A termination device as claimed in claim 5, wherein said IDCR generator counts the number of cells transmitted over a reference link during a predetermined time interval.

7. A termination device as claimed in claim 6, wherein said IDCR generator determines said time interval from a system clock.

8. A termination device as claimed in claim 1, wherein said interface circuit provides Utopia compliant interface.

9. A termination device as claimed in claim 1, wherein said per link output circuit includes a parallel to serial converter for placing said cells on said links as a serial bit stream.

10. A termination device as claimed in claim 3, further comprising a control cell modifying circuit upstream of said output circuit to modify said control cells in accordance with the inverse multiplexing protocol.

11. A termination device for connection to a group of TDM (time division multiplexed) links and capable of receiving streams of cells forming a virtual channel over one or more of said trunks, said cell streams arriving on said individual links or on a plurality of said links forming an inverse multiplexed ((MA) group, comprising:
    a per link input circuit for receiving incoming cell streams on said links; a per link cell delineation circuit for delineating incoming cells;
    a per link means for segregating control cells from user cells,
    a per group rate recovery block to generate the IDCR (MA Data Cell Rate);
    a buffer memory for storing incoming cells of an IMA group at specific memory locations;
    a per group inverse scheduler controlled by the IDCR and for arranging incoming cells of an IMA group in the correct order;
    an output circuit for outputting cells to a receiving device through an interface; and
    a memory controller selectively operable to direct incoming cells to said memory in an inverse multiplexing mode or to said output circuit in a UNI mode.

12. A termination device as claimed in claim 11, wherein said interface is a Utopia interface.

13. A termination device as claimed in claim 11, wherein said buffer memory is operable in a first mode wherein the buffer memory is divided into a plurality of blocks assigned to respective links, and a second mode wherein the buffer memory is divided into a larger number of blocks, varying numbers of blocks can be assigned to each link under program control.

14. A termination device as claimed in claim 11, wherein the user can program a guardband to minimize further recovery disruption when a link is added to an existing IMA group thereby optimizing the recombiner delay.

15. A termination device as claimed in claim 11 that can interface to existing T1 or E1 framers through a versatile PCM interface.

16. A termination device as claimed in claim 11, that can accept a programmable amount of differential delay for each operational IMA group.

* * * * *